(12) United States Patent
Mori et al.

(10) Patent No.: US 7,269,512 B2
(45) Date of Patent: Sep. 11, 2007

(54) INFORMATION PROCESSING APPARATUS AND GPS POSITIONING METHOD

(75) Inventors: Shinichiro Mori, Kawasaki (JP); Fumio Nagashima, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 11/275,963

(22) Filed: Feb. 7, 2006

(65) Prior Publication Data
US 2006/0116820 A1   Jun. 1, 2006

Related U.S. Application Data

(63) Continuation of application No. PCT/JP03/10352, filed on Aug. 14, 2003.

(51) Int. Cl.
G01C 21/00 (2006.01)

(52) U.S. Cl. ............ 701/213; 701/207; 701/214; 342/357.01; 342/357.05; 342/357.06; 342/357.08

(58) Field of Classification Search ........... 701/200, 701/207, 208, 213, 214; 342/357.01, 357.05, 342/357.06, 357.08, 357.09, 357.1; 340/988, 340/991, 992; 455/12.1
See application file for complete search history.

(56) References Cited

U.S. PATENT DOCUMENTS

2002/0190897 A1* 12/2002 Yamaashi et al. ...... 342/357.01

2003/0035500 A1* 2/2003 Jin ........................ 375/354

FOREIGN PATENT DOCUMENTS

| EP | 0462648 | 12/1991 |
|---|---|---|
| EP | 0661553 | 7/1995 |
| EP | 0803742 | 10/1997 |
| JP | 6-317645 | 11/1994 |
| JP | 8-201505 | 8/1996 |
| JP | 2000-181865 | 6/2000 |
| JP | 2000-235067 | 8/2000 |
| JP | 2001-268649 | 9/2001 |
| JP | 2001-337929 | 12/2001 |

* cited by examiner

*Primary Examiner*—Gertrude A. Jeanglaude
(74) *Attorney, Agent, or Firm*—Staas & Halsey LLP

(57) ABSTRACT

An information processing apparatus is configured to measure a Doppler shift in the frequency of a radio wave from a GPS (Global Positioning System) satellite and a pseudo-distance between the satellite and a measuring point by using the signal therefrom, and calculate the position of the measuring point by using the Doppler shift combined with the pseudo-distance

9 Claims, 10 Drawing Sheets

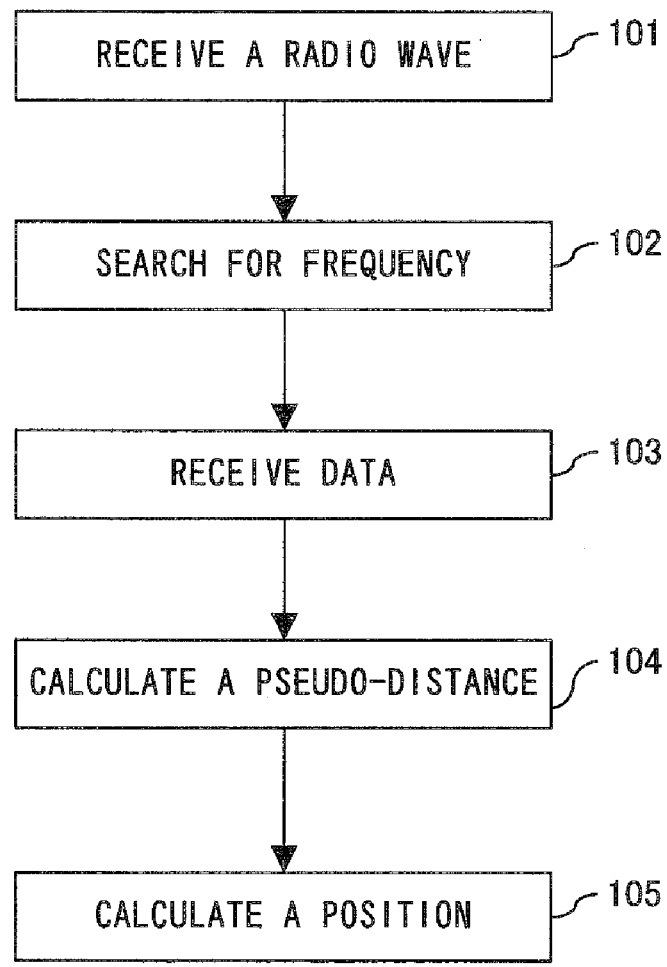
F I G. 1

INFORMATION PROCESSING APPARATUS AND GPS POSITIONING METHOD

CROSS REFERENCE TO RELATED APPLICATION

This application is a continuation application of International PCT Application No. PCT/JP2003/010352 which was filed on Aug. 14, 2003.

BACKGROUND OF THE INVENTION

1. Field of the Invention

The present invention relates to an information processing apparatus and GPS positioning method for measuring a position by utilizing the Doppler effect of a GPS (global positioning system) satellite.

2. Description of the Related Art

GPS positioning techniques utilizing a satellite (i.e., GPS satellite) are currently taken advantage of by diverse categories of information processing apparatuses such as a vehicle mounted apparatus, a mobile information terminal (e.g., personal digital assistant: PDA), a mobile phone, a PHS (Personal Handyphone System) and a PC (personal computer).

GPS positioning can largely be categorized into standalone positioning and interference positioning. The former is a method for acquiring no less than four GPS satellites, measuring pseudo-distances from a measuring point to the respective satellites, solving simultaneous equations containing four unknowns, and thereby calculating the position of the measuring point. Whereas the latter is a method for positioning by using a plurality of measuring points utilizing wave interference. The present invention relates to the former method, i.e., the stand alone positioning.

Navigation data of each GPS satellite used for GPS positioning is mainly categorized into almanac data and ephemeris data. The almanac data describes parameters for figuring out approximate positions of all the GPS satellites and can be used for about two weeks. The time limit is governed by the orbits of the respective GPS satellites changing with time and corresponds to the expiration date of the data.

The ephemeris data describes detailed parameters of satellite orbital information about each satellite and is used by an information processing apparatus for calculating the position of each satellite The time limit of the ephemeris data is about two hours.

FIG. 1 is an operation flow chart of a conventional stand alone positioning. First, an information processing apparatus receives a radio wave in a radio frequency (RF) band from a GPS satellite and converts it into a signal in an intermediate frequency (IF) band by down conversion (step 101).

Then it searches for a receiving frequency of the radio wave from the GPS satellite (step 102), in which information from a target satellite is extracted by multiplying a signal of the receiving radio wave by the CA code (coarse acquisition code) of the target satellite while considering the Doppler effect.

It then receives an almanac and ephemeris data from the target satellite (step 103) Likewise it receives navigation data from other GPS satellites. Recent times have seen systems for complementing the information by receiving the navigation data by way of another wireless network.

Then it calculates the pseudo-distance to each satellite from a radio wave emission clock time and radio wave receiving clock time for each satellite (step 104) and calculates the position of the measuring point by using the navigation data and the pseudo-distance of each satellite (step 105).

The equation used for the calculation in the step 105 is the following, defining the position of the measuring point by the coordinates (x, y, z), and the positions of acquired i-th GPS satellites by the coordinates $(x_i, y_i, z_i)$ for instance:

$$\sqrt{(x-x_i)^2+(y-y_i)^2+(z-z_i)^2}+C_b=R_i \qquad (1);$$

where $C_b$ expresses an amount caused by the clock difference between the satellite and the information processing apparatus, and $R_i$ expresses the pseudo-distance between the i-th satellite and the measuring point. The coordinates $(x_i, y_i, z_i)$ can be figured out from the ephemeris data of the respective satellites. Therefore, a solution is obtainable with the number of acquired satellites becoming no less than four because there are four unknowns in the equation, i.e., x, y, z and $C_b$. If a measuring point is restricted to the surface of the earth, a solution is obtainable with the number of acquired satellite being three.

As described above, the stand alone positioning generally requires the acquisition of four GPS satellites, but it is difficult to acquire four satellites simultaneously in a metropolis such as Tokyo, Japan, with many skyscrapers (i.e., super tall buildings) towering in places.

Let the case of measuring point moving from point A to point B on a road surrounded by a cluster of skyscrapers 201 through 206 as exemplified by FIG. 2 be considered. In this case, the number of acquired satellites is considered to increase at the points A and B since the four directions are visible, while the number of acquired satellites will be limited to the direction the same as the line connecting the points A and B during the time of moving from the point A to point B since the clusters of skyscrapers 202 and 205 are in the way. This prevents acquisition of the necessary number of satellites, resulting in an incapability of positioning.

In order to solve this problem, a car navigation system, et cetera, carries out complementary processing by an integrated use of techniques such as a gyro sensor, gradient sensor, vehicle speed sensor, map matching. Such techniques, however, are not yet practical when considering application to a mobile terminal represented by a mobile phone or a PHS.

Accordingly, a reduced number of GPS satellites required for positioning is desired for locations such as streets in the midst of skyscrapers. The use of the Doppler effect associated with the movement of satellites can be considered as such a method for reducing the number of acquired satellites.

There is a known technique for approximating a current position based on received signals from two satellites through the use of the Doppler effect (e.g., refer to patent document 1 below). The method disclosed thereby, however, is not capable of positioning a measuring point accurately.

Patent document 1: Japan patent application publication No. 2000-235067

SUMMARY OF THE INVENTION

An object of the present invention is to provide an information processing apparatus and GPS positioning method capable of obtaining the position of a measuring point with high precision by using a received signal from a small number of GPS satellites (N.B.: sometimes simply "satellite" herein).

An information processing apparatus according to the present invention, comprising a Doppler shift measurement unit, a distance measurement unit, a data acquisition unit and an arithmetic calculation unit, is configured to measure a current position by using a radio wave from a GPS satellite.

In a first positioning method, the Doppler shift measurement unit obtains the Doppler shift in the frequency of the radio wave from the satellite; and the distance measurement unit obtains the pseudo-distance between the satellite and a measuring point by using a signal from the satellite. The data acquisition unit acquires navigation data of the satellite. The arithmetic calculation unit obtains the position of the satellite and the relative velocity between the measuring point and the satellite from the navigation data, and calculates the position of the measuring point by using the obtained information, i.e., the position and the relative velocity of the satellite, the Doppler shift and the pseudo-distance.

The first positioning method makes it possible to obtain the position of a measuring point with high precision if the clock of the satellite is accurately synchronous with that of the information processing apparatus.

In a second positioning method, the Doppler shift measurement unit obtains the Doppler shift in the frequency of a radio wave from a first satellite and that in the frequency of a radio wave from a second satellite. The distance measurement unit obtains the pseudo-distance between the first satellite and a measuring point by using a signal from the first satellite, and that between the second satellite and the measuring point by using a signal from the second satellite. The data acquisition unit acquires respective navigation data of the first and second satellites.

The arithmetic calculation unit obtains the position of the first satellite and the relative velocity of the measuring point with respect to the first satellite from the navigation data thereof; and the position of the second satellite and the relative velocity between the measuring point and the second satellite from the navigation data thereof. And the arithmetic calculation unit calculates the position of the measuring point by using the obtained information, i.e., the position and relative velocity of the first satellite, the position and relative velocity of the second satellite, the Doppler shift of the radio wave from the first satellite, that of the radio wave from the second satellite, the pseudo-distance between the first satellite and the measuring point, and that between the second satellite and the measuring point.

The second positioning method makes it possible to obtain the position of a measuring point with high precision even if the clock of the satellite is not synchronous with that of the information processing apparatus.

The Doppler shift measurement unit corresponds to a later described correlator 604 or Doppler shift measurement module 609, both shown by FIG. 6 for example; and the distance measurement unit, data acquisition unit and arithmetic calculation unit correspond to a distance measurement module 605, navigation data analysis module 606 and arithmetic calculation circuit 607, respectively shown by FIG. 6.

The present invention enables the position of a measuring point to be accurately calculated by using only one GPS satellite under good conditions or only two thereof under normal conditions.

BRIEF DESCRIPTION OF THE DRAWINGS

FIG. 1 is an operation flow chart of conventional stand alone positioning;

DESCRIPTION OF THE PREFERRED EMBODIMENTS

The following is a detailed description of the preferred embodiment of the present invention referring to the accompanying drawings.

As described above, the conventional stand alone positioning measures the pseudo-distance between a GPS satellite and a measuring point to calculate the position of the measuring point. This is a method for obtaining the position of the measuring point from satellite positions at a positioning instance.

Each satellite moves along a determined orbit at a determined velocity. This movement brings forth a Doppler effect and therefore it is necessary to match a receiving frequency with a frequency shifted by an amount corresponding to the Doppler effect in order for an information processing apparatus to receive information from the satellite. As a method for measuring the Doppler shift, the information processing apparatus checks a correlation value between a signal from the satellite and a CA code generated by the information processing apparatus per se and locks the receiving frequency when detecting a correlation value of a prescribed threshold value or greater.

That is, the information processing apparatus detects a Doppler shift of the satellite. This Doppler shift is the apparent Doppler shift along the line of sight from a measuring point 302 on the earth 301 to a target satellite 303 as shown by FIG. 3.

Figure 2:
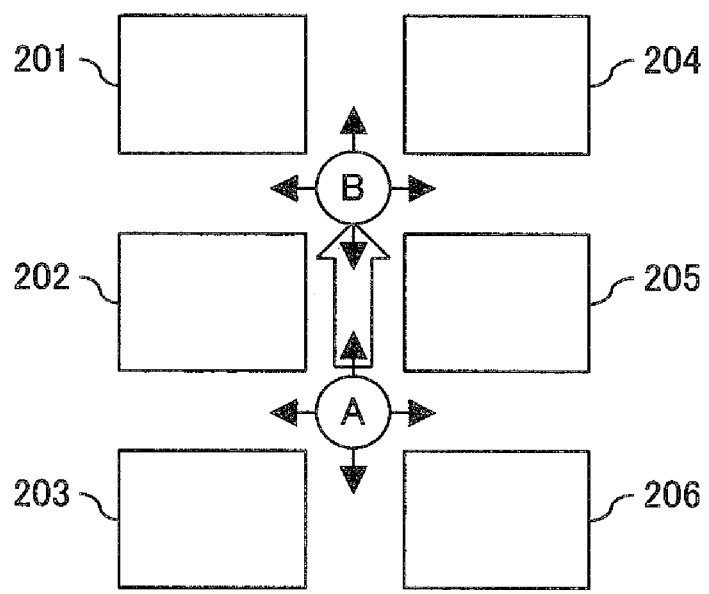
FIG. 2 shows measuring points in a street of skyscrapers.
Figure 3:
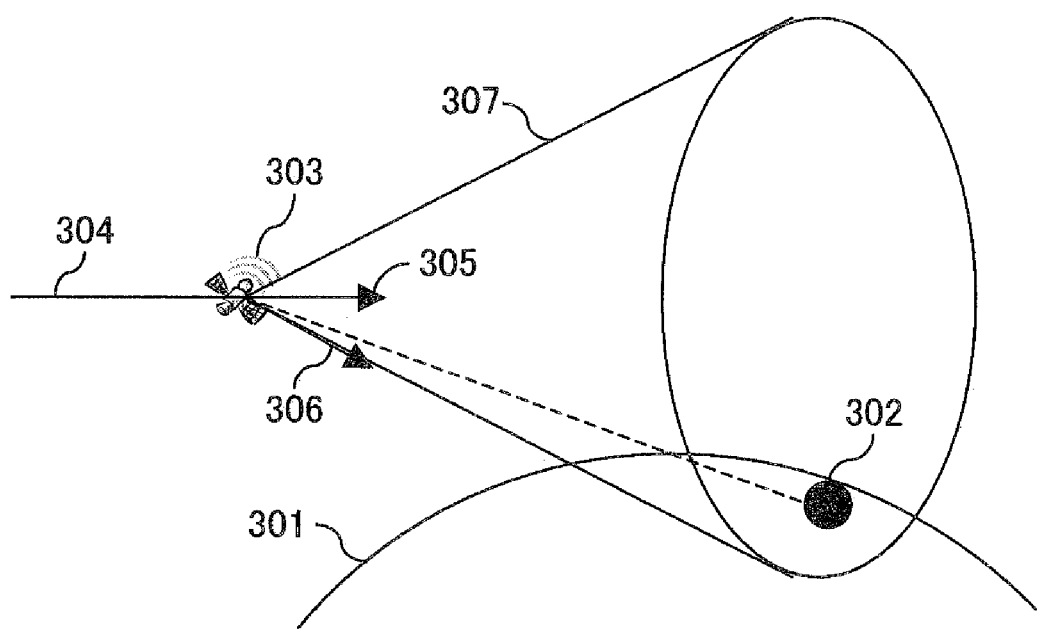
FIG. 3 shows a conical surface where the same Doppler shift as a measuring point is observed.

In FIG. 3, the satellite 303 is moving along the orbit 304 at a velocity vector 305 so that the apparent Doppler shift occurs in response to an apparent velocity vector 306 along the line of sight at the measuring point 302. The same Doppler shift can be observed at an arbitrary point on a conical surface 307 which is drawn by rotating the velocity vector 306 around the velocity vector 305 as the central axis. If the distance between the satellite and the measuring point is known in addition to the Doppler shift, then the position of the measuring point can apparently be calculated.

The next description is of a positioning algorithm according to the present embodiment. First, there are two contributing factors to a change in the frequency of a radio wave due to the Doppler effect:

(1) the Lorentz transformation effect, and (2) the Galilean transformation effect, where general relativistic effects are ignored herein.

<Lorentz Transformation Effect>

Figure 4:
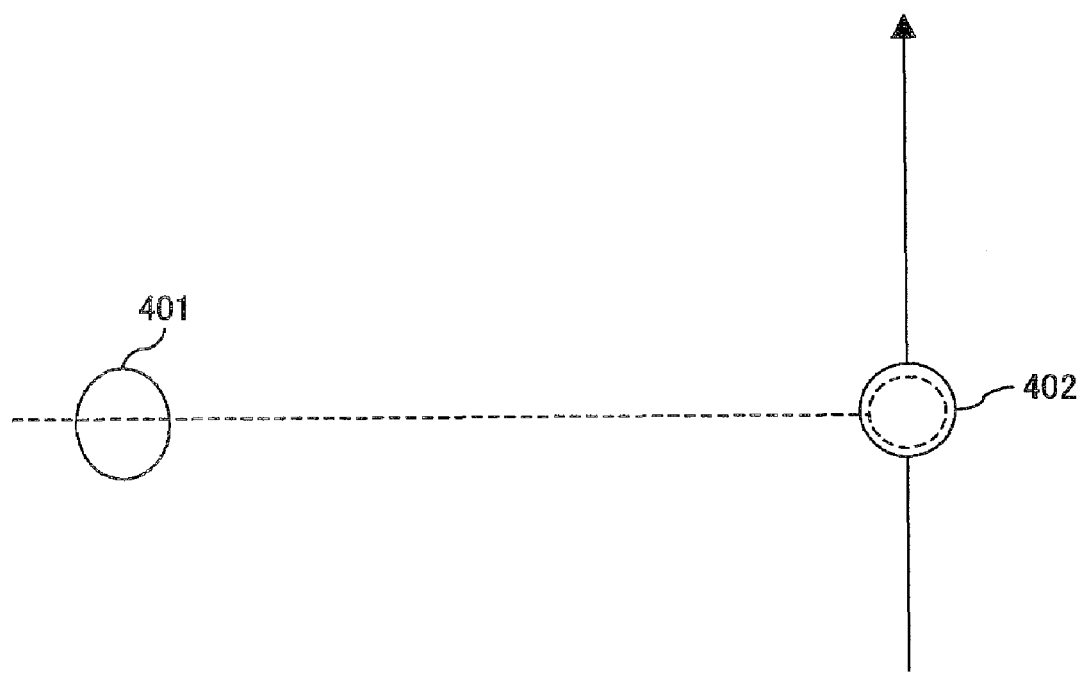
FIG. 4 describes a Lorentz transformation effect.

As shown by FIG. 4, a change in frequency due to a Lorentz transformation effect occurs if a GPS satellite 402 is moving perpendicular to the line of sight of an observer 401, that is, even at an instant when the distance between the observer 401 and the satellite 402 is not changing. This is a special relativistic effect.

Letting a cycle time in an inherent time of the observer 401 be $T_{lorentz}$, a cycle time of a radio wave in an inherent time of the satellite be $T_0$, a velocity of the observer 401 (i.e., relative velocity) looking from the satellite 402 be V and the velocity of light be c, the relationship between $T_{lorentz}$ and $T_0$ is expressed according to the Lorentz transformation as follows:

$$T_{lorentz} = \frac{T_0}{\sqrt{1 - \frac{V^2}{c^2}}} \qquad (2)$$

Therefore, a frequency $\omega_{lorentz}$ when looking from the observer 401, letting a frequency of the satellite be $\omega_0$, is expressed as follows:

$$\omega_{lorentz} = \omega_0 \sqrt{1 - \frac{V^2}{c^2}} \qquad (3)$$

Such a compression of radio wave is called a Lorentz contraction.

<Galilean Transformation Effect>

Figure 5:
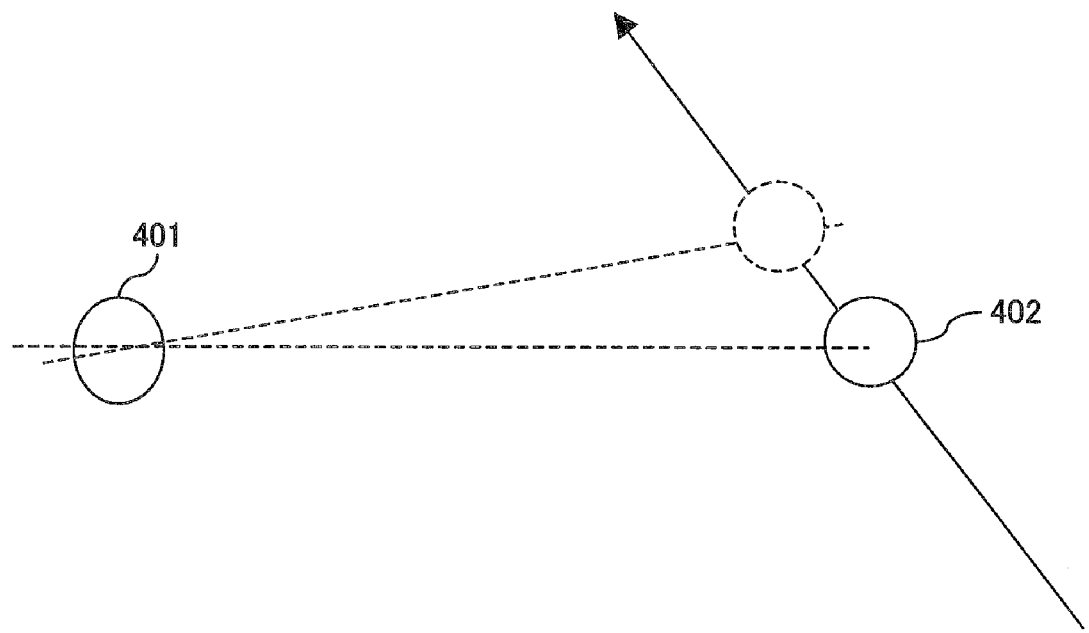
FIG. 5 describes a Galilean transformation effect.

As shown by FIG. 5, an effect of Galilean transformation is caused by a changing distance between the observer 401 and GPS satellite 402, which is the same as that of the Doppler effect on sound. Letting a positional vector of the observer 401 looking from the satellite 402 be (x, y, z), the distance between the satellite 402 and observer 401 be L and a velocity vector of the observer 401 looking from the satellite 402 be (u, v, w), then a rate of change of the distance $V_1$ is expressed as follows:

$$V_1 = \frac{d}{dt}\sqrt{x^2 + y^2 + z^2} = \frac{xu + yv + zw}{\sqrt{x^2 + y^2 + z^2}} = \frac{xu + yv + zw}{L} \qquad (4)$$

And taking both the Lorentz transformation and Galilean transformation effects into consideration, a cycle time T in the inherent time of the observer 401, increasing in proportion with a positional change rate, is expressed as follows:

$$T = \frac{V_1 T_{lorentz}}{c} + T_{lorentz} \qquad (5)$$

Substituting the expressions (2) and (4) into the expression (5) the following expression is obtained:

$$T = \frac{T_0\left(1 + \frac{xu + yv + zw}{cL}\right)}{\sqrt{1 - \frac{V^2}{c^2}}} \qquad (6)$$

Therefore, a frequency $\omega$ when looking from the observer 401 is expressed by:

$$\omega = \omega_0 \frac{\sqrt{1 - \frac{V^2}{c^2}}}{\left(1 + \frac{xu + yv + zw}{cL}\right)} \qquad (7)$$

A conversion of the expression (7) results in the following:

$$xu + yv + zw = cL\left(\frac{\omega_0}{\omega}\sqrt{1 - \frac{V^2}{c^2}} - 1\right) \qquad (8)$$

Ignoring special relativistic effects in the expression (8) the following expression is obtained:

$$xu + yv + zw = cL\left(\frac{\omega_0}{\omega} - 1\right) = cL\frac{\Delta\omega}{\omega}; \qquad (9)$$

where $\Delta\omega$ represents a frequency change which is given by the following expression:

$$\Delta\omega = \omega_0 - \omega \qquad (10)$$

The equation (9) expresses a curved surface in a three dimensional space, which the conical surface 307 shown by FIG. 3 corresponds to. Furthermore, the distance L between the satellite 402 and observer 401 is expressed by:

$$x^2 + y^2 + z^2 = L^2 \qquad (11)$$

The above equation (11) expresses a spherical surface which is a curved surface in a three dimensional space.

If there is no clock error in the information processing apparatus used by the observer 401, the distance L will be calculated accurately from the difference between a radio wave emitted clock time of the satellite 402 and radio wave receiving clock time. The observer 401 stands on the line of the intersection of the conical surface expressed by the equation (9) and the spherical surface expressed by the equation (11) And adding a condition of being on the surface of the earth, the solution usually converges to two points. Those two solution points present themselves at the axisymmetric points straddling the satellite orbit. If the measuring point were nearby and right below the satellite orbit, the two solution points would be close to each other, but usually one solution actually exists in a remote location.

Therefore, it is possible to narrow down the result to one solution point by filtering the two solution points by software filtering through the use of global positional information such as the measuring point being in Japan for instance, et cetera. Needless to say, there will be one solution if a measuring point is right below the satellite orbit.

As described above, a use of the positioning algorithm according to the present embodiment enables a calculation of the position of a measuring point by using a received wave from one satellite in a certain condition. A summary of the above described algorithm is as follows.

(a) The case of considering special relativistic effects $$(x - x_1)u_1 + (y - y_1)v_1 + (z - z_1)w_1 = cL_1\left(\frac{\omega_0}{\omega}\sqrt{1 - \frac{V^2}{c^2}} - 1\right) \qquad (12)$$

$$(x - x_1)^2 + (y - y_1)^2 + (z - z_1)^2 = L_1^2 \quad (13)$$

$$\sqrt{(x - x_E)^2 + (y - y_E)^2 + (z - z_E)^2} = R_E \quad (14)$$

where (x, y, z) is the position of the measuring point, $(x_1, y_1, z_1)$ is the position of satellites 402, $(x_E, y_E, z_E)$ is the center of the earth, $R_E$ is the radius of the earth, $L_1$ is a distance between the measuring point and the satellite 402, and $(u_1, v_1, w_1)$ is a velocity of the observer 401 looking from the satellite 402.

In this case, solving the equations (12), (13) and (14) about (x, y, z), being quadratic equations, obtains two sets of solution. Then, one of them is selected by using already known global positional information about the measuring point.

(b) the case of ignoring special relativistic effects $$(x - x_1)u_1 + (y - y_1)v_1 + (z - z_1)w_1 = cL_1\left(\frac{\Delta\omega}{\omega}\right) \quad (15)$$

$$(x - x_1)^2 + (y - y_1)^2 + (z - z_1)^2 = L_1^2 \quad (16)$$

$$\sqrt{(x - x_E)^2 + (y - y_E)^2 + (z - z_E)^2} = R_E \quad (17)$$

where $\Delta\omega$ is expressed by the equation (10).

In this case, solving the equations (15), (16) and (17) about (x, y, z) obtains two sets of solution as with the above described case (a) Then, one of them is selected by using the global positional information.

The following description is of an information processing apparatus using a positioning algorithm in the case of ignoring the above described specific relativistic effect for the sake of simplicity.

Figure 6:
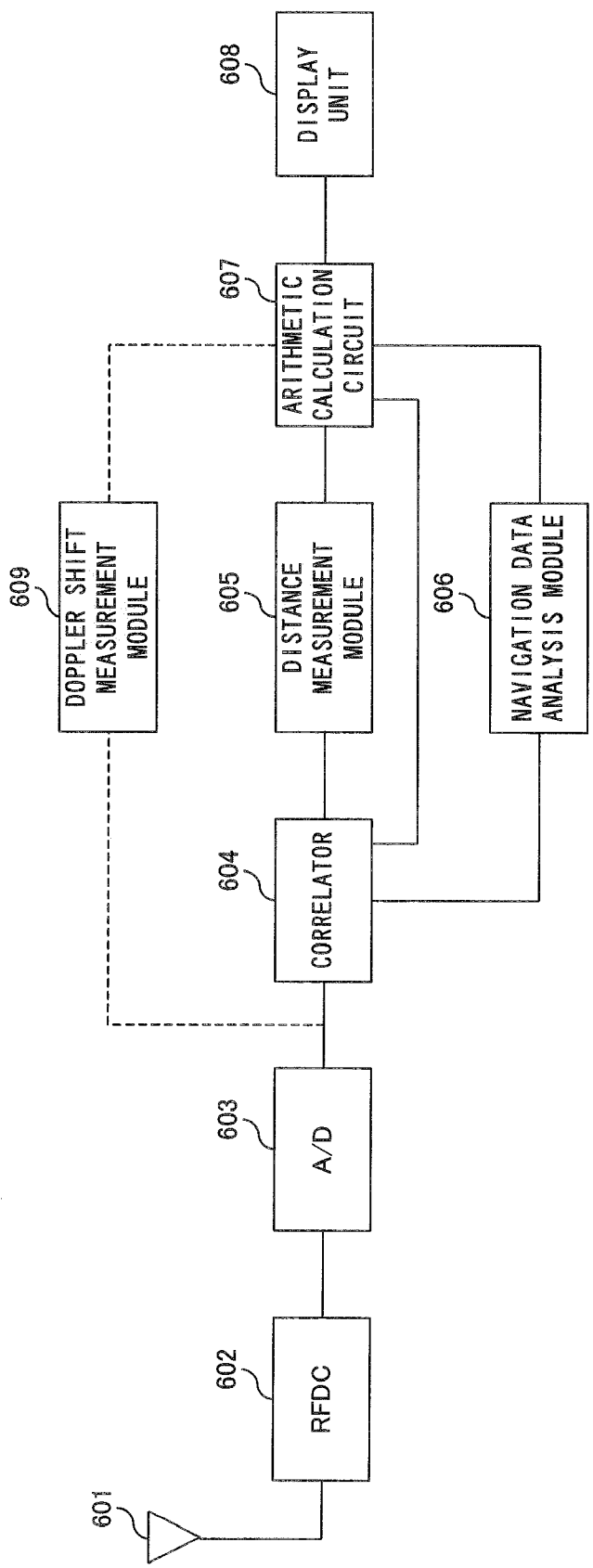
FIG. 6 shows a configuration of an information processing apparatus.

FIG. 6 shows a configuration of an information processing apparatus according to the present embodiment. The information processing apparatus shown by FIG. 6 comprises an antenna 601, an RF down converter (RFDC) unit 602, an analog/digital (AD) converter 603, a correlator 604, a distance measurement module 605, a navigation data analysis module 606, an arithmetic calculation circuit 607 and a display unit 608.

Figure 7:
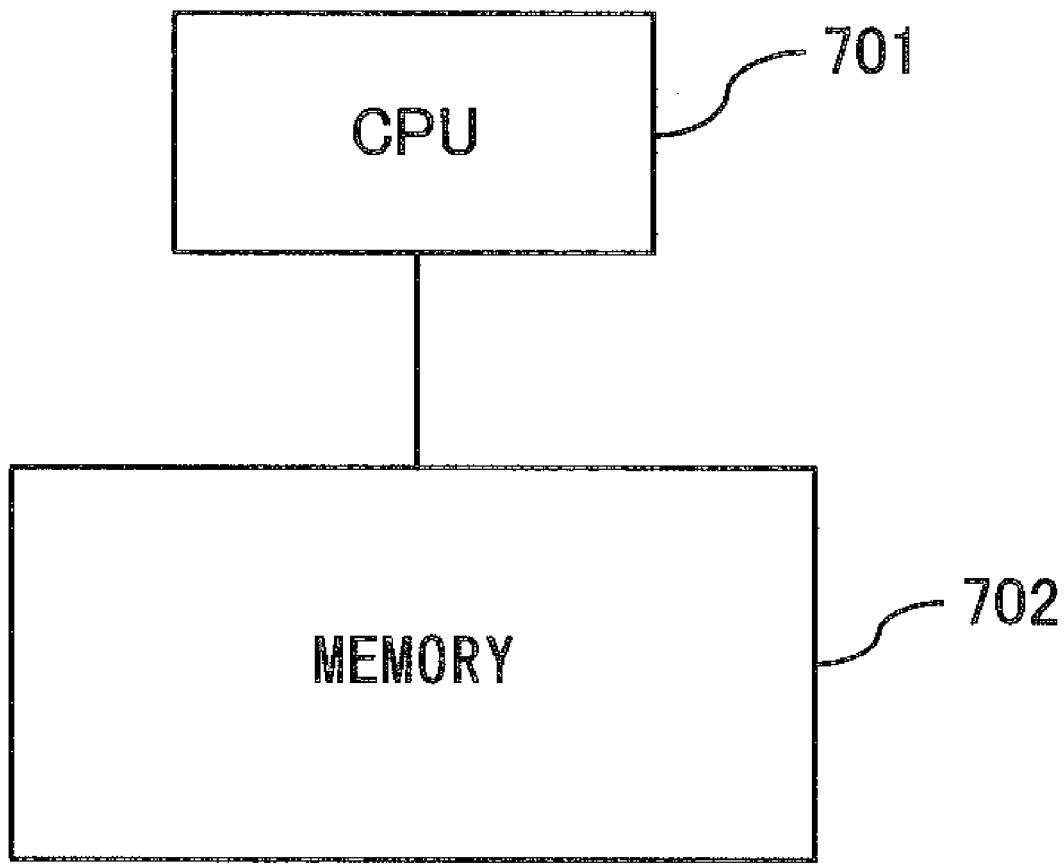
FIG. 7 shows a configuration of an arithmetic calculation circuit.

In the case of software executing a calculation of the above described positioning algorithm, the arithmetic calculation circuit 607 is configured by using a computer which includes a CPU (central processing unit) 701 and memory 702 as shown by FIG. 7. The memory 702, including ROM (read only memory) and RAM (random access memory), stores a program and data necessary for processing. The memory 702 stores the center position $(x_E, y_E, z_E)$ and radius $R_E$ of the earth, a frequency $\omega_0$ of a GPS satellite and the value of the velocity of light c as known data in advance.

Incidentally the program and data necessary for the processing can be installed into the information processing apparatus by way of a computer-readable storage medium such as a memory card, flexible disk, CD-ROM (compact disk read only memory), optical disk, magneto-optical disk.

Alternatively, the information processing apparatus can also be enabled to download a program and data from an external apparatus (e.g., server) by way of a wireless network, et cetera. In such a case, the external apparatus generates a propagation signal for propagating the program and data and transmits it to the information processing apparatus by way of a transmission medium on the wireless network.

Figure 8:
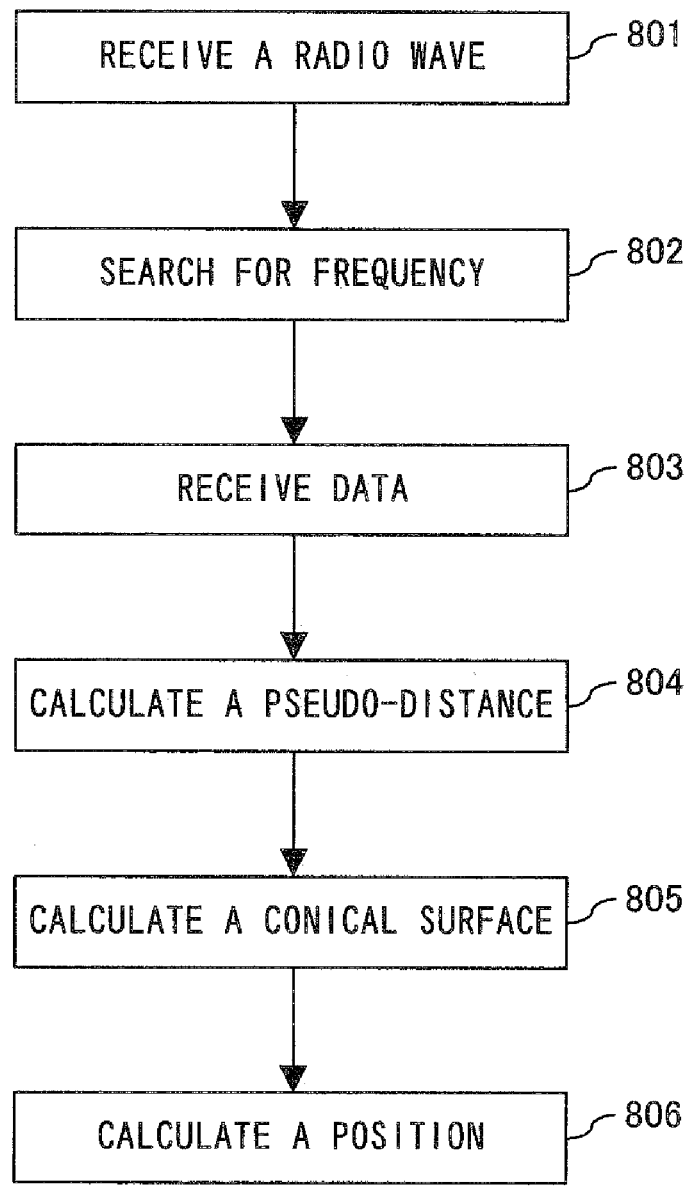
FIG. 8 is an operation flow chart of stand alone positioning according to the present invention.

FIG. 8 is an operation flowchart of stand alone positioning carried out by the information processing apparatus shown by FIG. 6. First of all, the antenna 601 receives a radio wave from a GPS satellite, and the RFDC unit 602 converts the received wave into a signal of the IF band (step 801).

Then, the A/D converter 603 converts the signal output from the RFDC unit 602 into a digital signal, and the correlator 604 searches for a received frequency based on the obtained digital signal (step 802).

In this event, the correlator 604 calculates a Doppler shift amount $\Delta\omega$ and a code shift amount by multiplying the digital signal output from the A/D converter 603 by the CA code of the target satellite, and outputs the $\Delta\omega$ to the arithmetic calculation circuit 607 and the code shift amount to the distance measurement module 605.

Then, the information processing apparatus receives navigation data from the target satellite, and the navigation data analysis module 606 extracts navigation data from the output of the correlator 604 to output to the arithmetic calculation circuit 607 (step 803).

The distance measurement module 605 calculates the pseudo-distance between the measuring point and target satellite from the code shift amount to output to the arithmetic calculation circuit 607 (step 804) If a clock difference between the target satellite and information processing apparatus is small enough, the pseudo-distance can be used as the distance $L_1$ between the measuring point and target satellite.

The arithmetic calculation circuit 607 calculates a parameter of the conical surface by using the $\Delta\omega$ and navigation data (step 805), by obtaining the position $(x_1, y_1, z_1)$ of the target satellite and the relative velocity $(u_1, v_1, w_1)$ of the measuring point with respect to the target satellite, and obtaining $\omega$ from the $\Delta\omega$ and $\omega_0$ to calculate a constant term and the unknowns x, y and z of the equation (15) (step 805).

Then, it solves the equations (15), (16) and (17) about (x, y, z) by using a pseudo-distance as $L_1$ to calculate the position of the measuring point (step 806). Here, if two sets of solution are obtained, they will be narrowed down to one by using a software filter (i.e., global positional information). The display unit 608 displays the calculated positional information as a positioning result on the display screen.

The configuration shown by FIG. 6 calculates the position of a measuring point by using navigation data received from the target satellite, it is possible, however, to obtain navigation data of the target satellite from a server installed on a network.

Meanwhile, a Doppler shift amount $\Delta\omega$ may be measured by a specifically installed Doppler shift measurement module 609 instead of measuring $\Delta\omega$ by the correlator 604, in which case the Doppler shift measurement module 609 obtains $\Delta\omega$ from the output signal of the A/D converter 603 to output to the arithmetic calculation circuit 607.

Note that the above described algorithm premises an accurate synchronization of clocks between a satellite and an information processing apparatus. Such a premise usually becomes effective right after the stand alone positioning is carried out once by a certain method, but is not available at an initial positioning. Consequently, it is necessary to carry out positioning by using a plurality of GPS satellites if those clocks in the satellite and information processing apparatus are not synchronous with each other. Accordingly, the next description is of a positioning algorithm for such a case.

A use of two GPS satellites obtains two sets of the equations (15) and (16), two sets of equation (1) expressing a clock time difference, and further the equation (17) exists as a constraining condition, making seven equations to be solved as follows:

$$(x-x_1)u_1 + (y-y_1)v_1 + (z-z_1)w_1 = cL_1 \frac{\Delta\omega_1}{\omega_1} \quad (18)$$

$$(x-x_2)u_2 + (y-y_2)v_2 + (z-z_2)w_2 = cL_2 \frac{\Delta\omega_2}{\omega_2} \quad (19)$$

$$(x-x_1)^2 + (y-y_1)^2 + (z-z_1)^2 = L_1^2 \quad (20)$$

$$(x-x_2)^2 + (y-y_2)^2 + (z-z_2)^2 = L_2^2 \quad (21)$$

$$\sqrt{(x-x_1)^2 + (y-y_1)^2 + (z-z_1)^2} + c\Delta T = R_1 \quad (22)$$

$$\sqrt{(x-x_2)^2 + (y-y_2)^2 + (z-z_2)^2} + c\Delta T = R_2 \quad (23)$$

$$\sqrt{(x-x_E)^2 + (y-y_E)^2 + (z-z_E)^2} = R_E; \quad (24)$$

where, the following lists the definition of each parameter:

($x_1$, $y_1$, $z_1$): position of first satellite;
($u_1$, $v_1$, $w_1$): relative velocity of a measuring point with respect to the first satellite;
$L_1$: distance between the measuring point and first satellite;
$R_1$: pseudo-distance between the measuring point and first satellite;
$\Delta\omega_1$: Doppler shift amount of the first satellite;
$\omega_1$: apparent frequency of the first satellite;
($x_2$, $y_2$, $z_2$): position of a second satellite;
($u_2$, $v_2$, $w_2$): relative velocity of the measuring point with respect to the second satellite;
$L_2$: distance between the measuring point and second satellite;
$R_2$: pseudo-distance between the measuring point and second satellite;
$\Delta\omega_2$: Doppler shift amount of the second satellite;
$\omega_2$: apparent frequency of the second satellite; and
$\Delta T$: clock time difference (common to the two satellites)

Since the relationship between the distance $L_i$ and pseudo-distance $R_i$ is expressed by $L_i = R_i - c\Delta T$, the equations (20) and (21) are dependent on each other, and so are the equations (21) and (23) Accordingly, elimination of two of the interdependent equations will leave five equations to be solved. On the other hand, there are four unknowns, i.e., position of measuring point (x, y, z) and clock time difference $\Delta T$, resulting in one excess equation. A utilization of this redundancy enables a reduction of positioning error.

Figure 9:
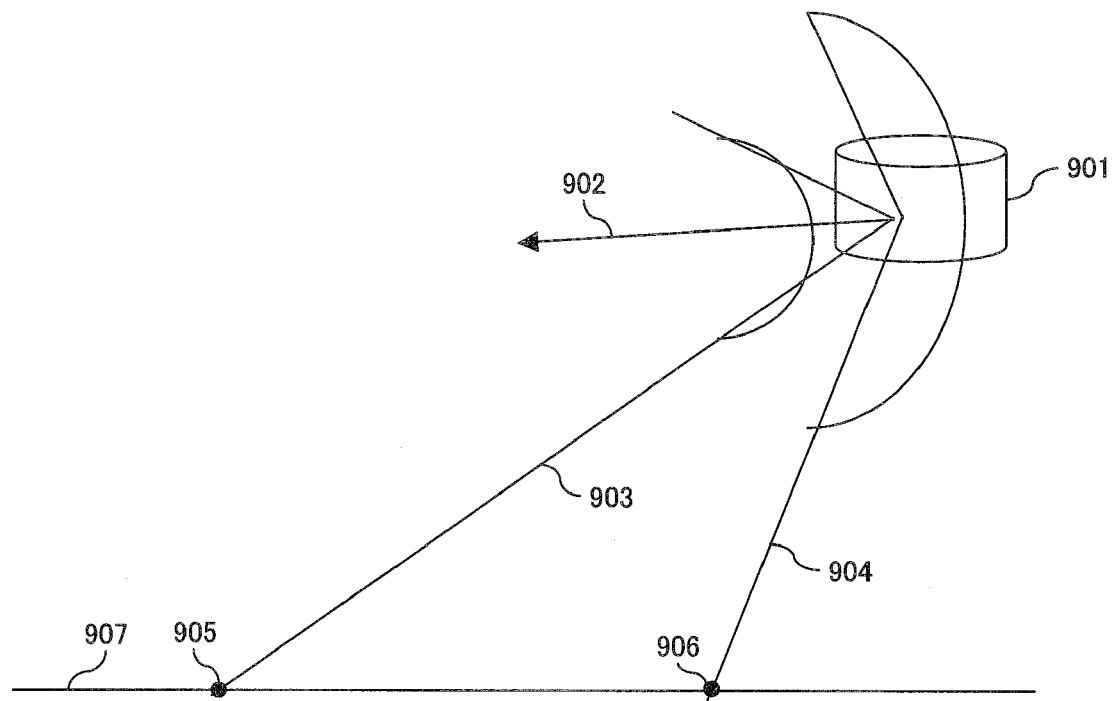
FIG. 9 shows positions of two measuring points corresponding to the theoretical maximum value and minimum value of Doppler shift respectively.

Here, error mixing, variable quantities are limited to $\Delta\omega_i$. As $\Delta\omega_i$ fluctuates, the calculated position of a measuring point walks on an approximately straight line on the surface of the earth as shown by FIG. 9, forming a line segment representing a positioning identification error. Actually, this position walks on a circular arc, but it can be regarded as an approximate straight line because the radius of the earth is very large.

In FIG. 9, a satellite 901 is moving along the satellite orbit according to a velocity vector 902, and a line segment on the earth surface 907 is parallel with the velocity direction of the satellite. The position (x, y, z) of the starting point 906 of the line segment is calculated from the conical surface 904 of the Doppler effect corresponding the theoretical minimum value of $\Delta\omega_i$, and the position (x, y, z) of the terminal point 905 is calculated from the conical surface 903 corresponding to the theoretical maximum value of $\Delta\omega_i$.

The theoretical maximum and minimum values of $\Delta\omega_i$ express the upper and lower limit values of the Doppler shift amount estimated from a measurement result. For example, if the minimum unit of measurement of $\Delta\omega_i$ is 1 Hz and a measurement result is 1234 Hz, then the theoretical maximum value is 1235 Hz and the theoretical minimum value 1233 Hz.

Figure 10:
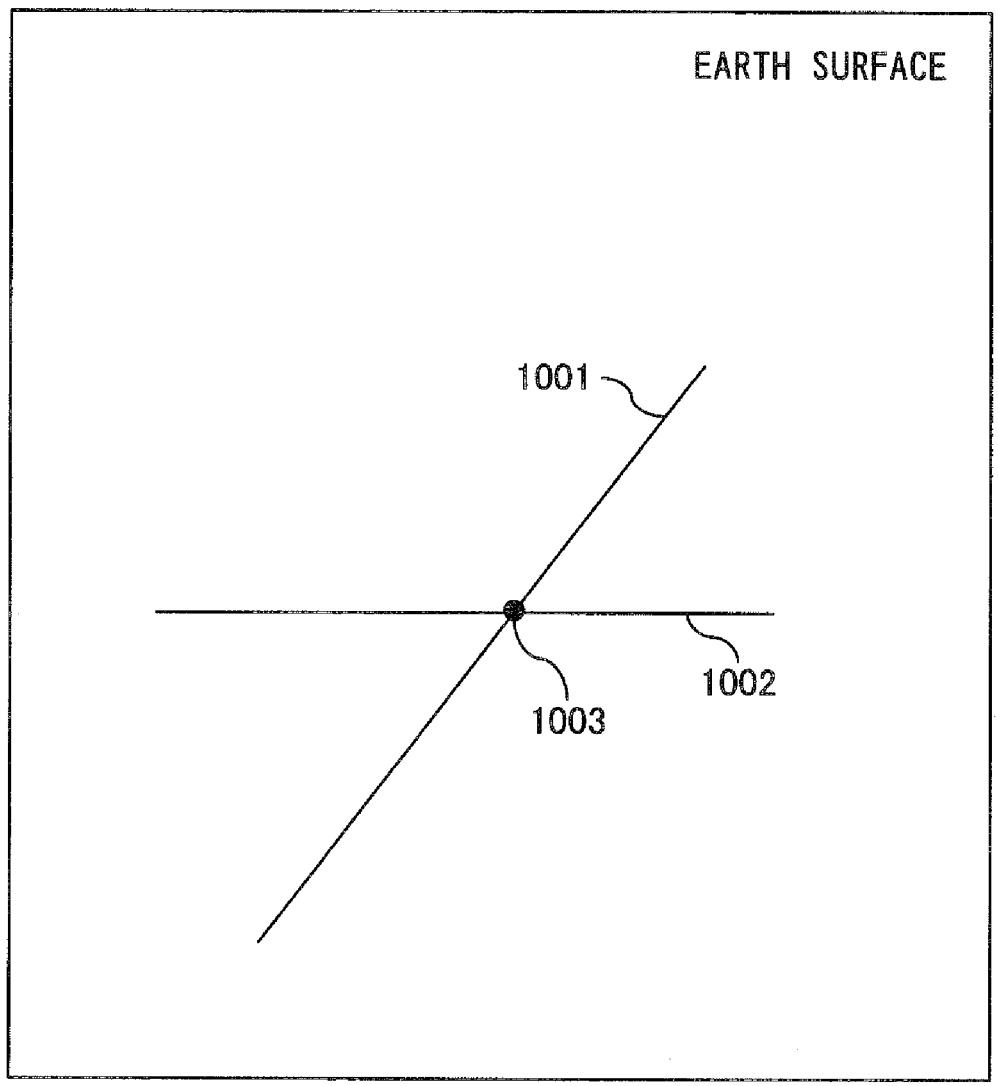
FIG. 10 shows two line segments corresponding to Doppler shift error of two satellites respectively.

Here, if two line segments 1001 and 1002 respectively obtained by measurement results by using two satellites intersect as shown by FIG. 10, the position of the point of intersection 1003 is regarded as the closest to the true position. Therefore the adoption of this position as the position of the measuring point makes positioning error extremely small, theoretically positioning error caused by $\Delta\omega_i$ approaches zero. However errors caused by other factors are not taken into consideration.

The basic operation in the case of using such a positioning algorithm is the same as FIG. 8, except that the operations of the steps 801 through 804 will be carried out for the two satellites respectively. Then in the steps 805 and 806 the arithmetic calculation circuit 607 carries out the processes of:

(1-1) calculating (x, y, z) and $\Delta T$ by using the theoretical maximum value of $\Delta\omega_1$ and the equations (18), (22), (23) and (24);

(1-2) calculating (x, y, z) and $\Delta T$ by using the theoretical minimum value of $\Delta\omega_1$ and the equations (18), (22), (23) and (24);

(1-3) calculating (x, y, z) and $\Delta T$ by using the theoretical maximum value of $\Delta\omega_2$ and the equations (19), (22), (23) and (24);

(1-4) calculating (x, y, z) and $\Delta T$ by using the theoretical minimum value of $\Delta\omega_2$ and the equations (19), (22), (23) and (24);

(1-5) obtaining an equation for a first straight line connecting a point calculated from the theoretical maximum value of $\Delta\omega_1$ and a point calculated from the theoretical minimum value thereof;

(1-6) obtaining an equation for a second straight line connecting a point calculated from the theoretical maximum value of $\Delta\omega_2$ and a point calculated from the theoretical minimum value thereof; and (1-7) obtaining the intersection point between the first and second straight lines and confirming that the obtained intersection point is on the two line segments as follows:

a line segment connecting a point calculated from the theoretical maximum value of $\Delta\omega_1$ and a point calculated from the theoretical minimum value thereof; and a line segment connecting a point calculated from the theoretical maximum value of $\Delta\omega_2$ and a point calculated from the theoretical minimum value thereof.

If the intersection point is not on either line segment, the above described processes (1-1) through (1-7) will be repeated by increasing the minimum unit of measurement of $\Delta\omega_i$ by a prescribed value. And when obtaining an intersection point between the two line segments, the position of the intersection point will be output as the position of the measuring point.

Such a positioning algorithm enables a calculation of the position of the measuring point by using respectively received waves from two GPS satellites only, if the clocks of the satellites and information processing apparatus are not synchronous with each other. Moreover, if the clock of the information processing apparatus is synchronized with that of the satellite by using the simultaneously obtained $\Delta T$, stand alone positioning by using one satellite is maintained effective for a period of time thereafter.

The same positioning algorithm can be used for the case of acquiring one satellite after a time lag, for a stationary measuring point, instead of acquiring two satellites. In such a case, the information processing apparatus acquires the same satellite again in a certain period of time after acquiring it for the first time, regards the satellite acquired for the first time as the first satellite and the satellite acquired for the second time as the second satellite to carry out a positioning by the processes of:

(2-1) acquiring a target satellite to perform the processes of the above described (1-1) and (1-2) by regarding the acquired satellite as the first satellite;

(2-2) acquiring the same satellite anew after a certain period of time to perform the processes of the above described (1-3) and (1-4) by regarding the acquired satellite as the second satellite; and (2-3) performing the processes of the above described (1-5) through (1-7). The processing in the case of the intersection point not being on either line segment is the same as described above.

While the above described embodiment deals with the positioning method by using either one or two GPS satellites, the number of satellites is in no way limited to either one or two, and rather, larger numbers of satellites may be used for further improving positioning accuracy.

What is claimed is:

1. An information processing apparatus for measuring a current position by using a radio wave from a single GPS satellite, comprising:

a Doppler shift measurement unit obtaining a Doppler shift in a freguency of the radio wave from the satellite;

a distance measurement unit obtaining a pseudo-distance between the satellite and a measuring point by using a signal from the satellite;

an arithmetic calculation unit calculating a position of the measuring point by using the Doppler shift combined with the pseudo-distance, thereby obtaining the position of the measuring point with high precision using only the single GPS satellite when a clock of the satellite is synchronous with a clock of the information processing apparatus; and a data acquisition unit acguiring navigation data of the satellite, wherein said arithmetic calculation unit obtains a position of the satellite and a relative velocity between the measuring point and the satellite from the navigation data, and calculates the position of the measuring point by using the obtained position and relative velocity of the satellite, the Doppler shift and the pseudo-distance, and wherein said Doppler shift measurement unit includes a correlator which generates a code shift amount by obtaining a correlation value between a signal from said satellite and a prescribed code, and obtains said Doppler shift from an output of the correlator; and said distance measurement unit obtains said pseudo-distance from the code shift amount generated by the correlator.

2. An information processing apparatus for measuring a current position by using a radio wave from a GPS satellite, comprising:

a Doppler shift measurement unit obtaining a Doppler shift in a frequency of a radio wave from a first satellite and a Doppler shift in a frequency of a radio wave from a second satellite;

a distance measurement unit obtaining a pseudo-distance between the first satellite and a measuring point by using a signal from the first satellite, and a pseudo-distance between the second satellite and the measuring point by using a signal from the second satellite;

a data acquisition unit acquiring navigation data of the first and second satellites, respectively; and an arithmetic calculation unit obtaining a position of the first satellite and a relative velocity between the measuring point and the first satellite from the navigation data of the first satellite, obtaining a position of the second satellite and a relative velocity between the measuring point and the second satellite from the navigation data of the second satellite, and calculating the position of the measuring point by using the obtained position and relative velocity of the first satellite, the obtained position and relative velocity of the second satellite, the Doppler shift in the radio wave from the first satellite, the Doppler shift in the radio wave from the second satellite, the pseudo-distance between the first satellite and the measuring point, and the pseudo-distance between the second satellite and the measuring point.

3. The information processing apparatus according to claim 2, wherein said arithmetic calculation unit obtains a first line segment connecting a position of a measuring point calculated by using a theoretical maximum value of Doppler shift in the radio wave from said first satellite with a position of the measuring point calculated by using a theoretical minimum value of Doppler shift in the radio wave from said first satellite, and a second line segment connecting a position of the measuring point calculated by using a theoretical maximum value of Doppler shift in the radio wave from said second satellite with a position of the measuring point calculated by using a theoretical minimum value of Doppler shift in the radio wave from said second satellite, and calculates a position of an intersection point between the obtained first and second line segments.

4. The information processing apparatus according to claim 2, acquiring one satellite, followed by acquiring the same satellite again when a certain period of time elapses thereafter, regards the initially acquired satellite as the first satellite and the satellite acquired for the second time as the second satellite, and thereby obtains the position of said measuring point.

5. A computer readable storage medium storing a program for use in an information processing apparatus for measuring a current position by using a radio wave from a single GPS satellite, wherein the program enables the information processing apparatus to perform:

obtaining a Doppler shift in a freguency of the radio wave from the satellite;

obtaining a pseudo-distance between the satellite and a measuring point by using a signal from the satellite, calculating a position of the measuring point by using the Doppler shift combined with the pseudo-distance, thereby obtaining the position of the measuring point with high precision using only the single GPS satellite when a clock of the satellite is synchronous with a clock of the information processing apparatus; and obtaining navigation data of the satellite, wherein said calculating obtains a position of the satellite and a relative velocity between the measuring point and the satellite from the navigation data, and calculates the position of the measuring point by using the obtained position and relative velocity of the satellite, the Doppler shift and the pseudo-distance, and wherein said Doppler shift is obtained from an output of a correlator which generates a code shift amount by obtaining a correlation value between a signal from said satellite and a prescribed code, and said pseudo-distance is obtained from the code shift amount generated by the correlator.

6. An information processing apparatus for measuring a current position by using a radio wave from a GPS satellite, comprising:
   a Doppler shift measurement unit obtaining a Doppler shift in a frequency of the radio wave from the satellite;
   a distance measurement unit obtaining a pseudo-distance between the satellite and a measuring point by using a signal from the satellite;
   an arithmetic calculation unit calculating a position of the measuring point by using the Doppler shift combined with the pseudo-distance; and
   a data acquisition unit acquiring navigation data of the satellite,
   wherein said arithmetic calculation unit obtains a position of the satellite and a relative velocity between the measuring point and the satellite from the navigation data, and calculates the position of the measuring point by using the obtained position and relative velocity of the satellite, the Doppler shift and the pseudo-distance, and
   wherein said Doppler shift measurement unit includes a correlator which generates a code shift amount by obtaining a correlation value between a signal from said satellite and a prescribed code, and obtains said Doppler shift from an output of the correlator; and said distance measurement unit obtains said pseudo-distance from the code shift amount generated by the correlator.

7. An information processing apparatus for measuring a current position by using a radio wave from a GPS satellite, comprising:
   a Doppler shift measurement unit obtaining a Doppler shift in a frequency of the radio wave from the satellite;
   a distance measurement unit obtaining a pseudo-distance between the satellite and a measuring point by using a signal from the satellite;
   an arithmetic calculation unit calculating a position of the measuring point by using the Doppler shift combined with the pseudo-distance; and
   a data acquisition unit acquiring navigation data of the satellite,
   wherein said arithmetic calculation unit obtains a position of the satellite and a relative velocity between the measuring point and the satellite from the navigation data, and calculates the position of the measuring point by using the obtained position and relative velocity of the satellite, the Doppler shift and the pseudo-distance, and
   wherein said arithmetic calculation unit calculates the position of said measuring point by using said pseudo-distance as an actual distance between said satellite and the measuring point after a clock of the satellite synchronizes with a clock of said information processing apparatus.

8. A computer readable storage medium storing a program for use in an information processing apparatus for measuring a current position by using a radio wave from a GPS satellite, wherein the program enables the information processing apparatus to perform:
   obtaining a Doppler shift in a frequency of the radio wave from the satellite;
   obtaining a pseudo-distance between the satellite and a measuring point by using a signal from the satellite;
   calculating a position of the measuring point by using the Doppler shift combined with the pseudo-distance; and
   obtaining navigation data of the satellite,
   wherein said calculating obtains a position of the satellite and a relative velocity between the measuring point and the satellite from the navigation data, and calculates the position of the measuring point by using the obtained position and relative velocity of the satellite, the Doppler shift and the pseudo-distance, and
   wherein said Doppler shift is obtained from an output of a correlator which generates a code shift amount by obtaining a correlation value between a signal from said satellite and a prescribed code, and said pseudo-distance is obtained from the code shift amount generated by the correlator.

9. A computer readable storage medium storing a program for use in an information processing apparatus for measuring a current position by using a radio wave from a GPS satellite, wherein the program enables the information processing apparatus to perform:
   obtaining a Doppler shift in a frequency of the radio wave from the satellite;
   obtaining a pseudo-distance between the satellite and a measuring point by using a signal from the satellite;
   calculating a position of the measuring point by using the Doppler shift combined with the pseudo-distance; and
   obtaining navigation data of the satellite,
   wherein said calculating obtains a position of the satellite and a relative velocity between the measuring point and the satellite from the navigation data, and calculates the position of the measuring point by using the obtained position and relative velocity of the satellite, the Doppler shift and the pseudo-distance, and
   wherein said information processing apparatus calculates the position of said measuring point by using said pseudo-distance as an actual distance between said satellite and the measuring point after a clock of the satellite synchronizes with a clock of said information processing apparatus.

* * * * *